United States Patent
Gallovich

(10) Patent No.: US 7,049,942 B2
(45) Date of Patent: May 23, 2006

(54) METHOD AND SYSTEM FOR PREVENTING VEHICLE THEFTS

(75) Inventor: Jason Gallovich, 158 St-Charles, Valleyfield, Quebec (CA) J6S 4A4

(73) Assignee: Jason Gallovich, Dorval (CA)

(*) Notice: Subject to any disclaimer, the term of this patent is extended or adjusted under 35 U.S.C. 154(b) by 0 days.

(21) Appl. No.: 10/612,879

(22) Filed: Jul. 7, 2003

(65) Prior Publication Data

US 2005/0007242 A1   Jan. 13, 2005

(51) Int. Cl.
*B60R 25/10* (2006.01)

(52) U.S. Cl. .............................. 340/426.1; 340/426.19; 340/505; 307/10.2

(58) Field of Classification Search .......... 340/426.19, 340/426.1, 426.16, 463, 505, 516, 536, 992, 340/993, 571, 568.1; 307/9.1, 10.1, 10.2; 705/4, 14
See application file for complete search history.

(56) References Cited

U.S. PATENT DOCUMENTS

| | | | |
|---|---|---|---|
| 5,083,814 A | 1/1992 | Guinta et al. | |
| 5,661,473 A * | 8/1997 | Paschal | 340/825.36 |
| 5,745,037 A * | 4/1998 | Guthrie et al. | 340/573.4 |
| 5,886,634 A | 3/1999 | Muhme | |
| 5,950,169 A | 9/1999 | Borghesi et al. | |
| 5,963,129 A | 10/1999 | Warner | |
| 5,983,238 A | 11/1999 | Becker et al. | |
| 6,052,068 A * | 4/2000 | Price R-W et al. | 340/933 |
| 6,052,631 A | 4/2000 | Busch et al. | |
| 6,074,570 A | 6/2000 | Samonides | |
| 6,076,064 A | 6/2000 | Rose, Jr. | |
| 6,222,463 B1 * | 4/2001 | Rai | 340/928 |
| 6,232,877 B1 | 5/2001 | Ashwin | |
| 6,335,679 B1 * | 1/2002 | Thomas et al. | 340/426.13 |
| 6,366,220 B1 | 4/2002 | Elliott | |
| 6,415,536 B1 | 7/2002 | Nobrega, Jr. | |
| 6,427,913 B1 * | 8/2002 | Maloney | 235/383 |
| 2001/0053981 A1 | 12/2001 | Wyssen | |
| 2002/0007289 A1 | 1/2002 | Malin et al. | |
| 2002/0153418 A1 | 10/2002 | Maloney | |
| 2002/0194476 A1 | 12/2002 | Lewis et al. | |
| 2003/0008722 A1 | 1/2003 | Konow | |
| 2004/0084525 A1 * | 5/2004 | Kreiner et al. | 235/384 |

* cited by examiner

*Primary Examiner*—Jeffery Hofsass
*Assistant Examiner*—Eric Blount
(74) *Attorney, Agent, or Firm*—Ogilvy Renault LLP

(57) ABSTRACT

There is described a system for preventing vehicle theft, the system comprising: a plurality of signal emitting devices placed and camouflaged among various parts of a vehicle, each of the plurality of signal emitting devices being independent of the vehicle's power source; readers placed at a plurality of locations in a geographical area and connected to a network having a central location, the readers receiving signals from the plurality of signal emitting devices and transferring reader data to the central location; and a central database at the central location comprising registration data for each vehicle equipped with the signal emitting devices, and whereby the central database is correlated with the reader data to identify vehicles that have been stolen.

31 Claims, 3 Drawing Sheets

METHOD AND SYSTEM FOR PREVENTING VEHICLE THEFTS

FIELD OF THE INVENTION

The invention relates to the field of vehicle theft. More specifically, it relates to a method and system for dissuading vehicle thieves from stealing a vehicle and encouraging vehicle owners to adopt the method and system.

BACKGROUND OF THE INVENTION

Even with the advent of several new technologies in the vehicle tracking and theft prevention arena, vehicle theft is still on the rise. Vehicle tracking does not stop the theft from occurring nor does it serve as a major deterrent. The overwhelming majorities of conventional anti-theft devices are easily removable or bypassed and thus offer little or no deterrence to a thief.

Tracking systems are all "hard wired" to the vehicle in which they are installed thus limiting the places in which they can be hidden and making them vulnerable to being discovered, deactivated and or removed. Also, because they rely on radio frequencies and operate using 2-way communication they can easily be detected and "jammed", or rendered inoperable with well-known devices such as frequency jammers.

For their part, more traditional systems such as audible alarms or ignition kill systems are very easily by-passed. These systems are also "hard wired" to the vehicle's power source and can be by-passed when a thief disables the vehicle's main power source and uses an alternate one. The wires leading to a siren on an audible alarm system can easily be located and cut prior to setting off the alarm when attempting to steal the vehicle. Also the public has grown more and more immune to the sound of a vehicle alarm because of the so-called "false alarm syndrome" thus giving thieves even more reaction time.

Conventional systems as described above have had little or no positive effect on theft caused by customer or owner fraud. Statistics show that approximately 15% to 20% of vehicle thefts are related to fraud. The customer or owner benefits from having plenty of time to clear the vehicle of any security systems before he or she attempts to report the vehicle as being stolen or missing.

Furthermore, as electrical systems found in vehicles become increasingly complex and sensitive, consumers and vehicle manufactures are becoming increasingly weary of these "hard wired" systems due to the fact that their interaction with the vehicle circuits can cause several mal functions. In some cases the installation of "hard wired" systems can even void certain vehicle manufacturer warranties. As for traditional transponder systems they operate at very limited ranges and can only be used in a very specific area such as a room or doorway.

SUMMARY OF THE INVENTION

Accordingly, an object of the present invention is to provide a vehicle theft prevention system that will overcome the drawbacks of the state of the art.

Another object of the present invention is to deter thieves from stealing vehicles.

Yet another object of the present invention is to provide a system that will be advantageous for all parties involved in the vehicle industry.

According to a first broad aspect of the present invention, there is provided a method for locating stolen vehicles, the method comprising: providing each of the vehicles with a plurality of signal emitting devices, each of the plurality of signal emitting devices being independent of the vehicle's power source and camouflaged among the vehicles' various parts; registering each of the vehicles in a central database; placing readers for receiving signals from the plurality of signal emitting devices at a plurality of locations in a geographical area; connecting the readers to a network having a central location such that all information being processed by the readers is transferred to and accessible by the central location; and correlating the information being processed by the readers with the central database to identify vehicles that have been reported stolen.

Preferably, the signal emitting devices operate at different frequencies, at varying signal strengths, and at different emitting times.

According to a second broad aspect of the present invention, a system for preventing vehicle theft, the system comprising: a plurality of signal emitting devices placed and camouflaged among various parts of a vehicle, each of the plurality of signal emitting devices being independent of the vehicle's power source; readers placed at a plurality of locations in a geographical area and connected to a network having a central location, the readers receiving signals from the plurality of signal emitting devices and transferring reader data to the central location; and a central database at the central location comprising registration data for each vehicle equipped with the signal emitting devices, and whereby the central database is correlated with the reader data to identify vehicles that have been stolen.

Preferably, the readers are placed in scrap yards, ports, body shops, overnight parking lots, and border crossings and are positioned to scan all vehicles which enter and leave an enclosed area.

According to a third broad aspect of the invention, there is provided a method for preventing vehicle thefts, the method comprising: at least one insurance company encouraging vehicle owners to install a vehicle theft prevention system in a vehicle by providing incentives to the vehicle owners having installed the system, the vehicle theft prevention system comprising a plurality of signal emitting devices placed among various parts of the vehicle; the insurance company mandating vendors wishing to do business with the insurance company to install readers for receiving signals from the plurality of signal emitting devices and transferring reader data to a central location; and correlating the information being processed by the readers with a central database to identify vehicles that have been reported stolen.

Preferably, the insurance company does not do business with vendors which are not equipped with the readers, and provides incentives such as rebates to its customers to use the vehicle theft prevention system.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

Figure 1:
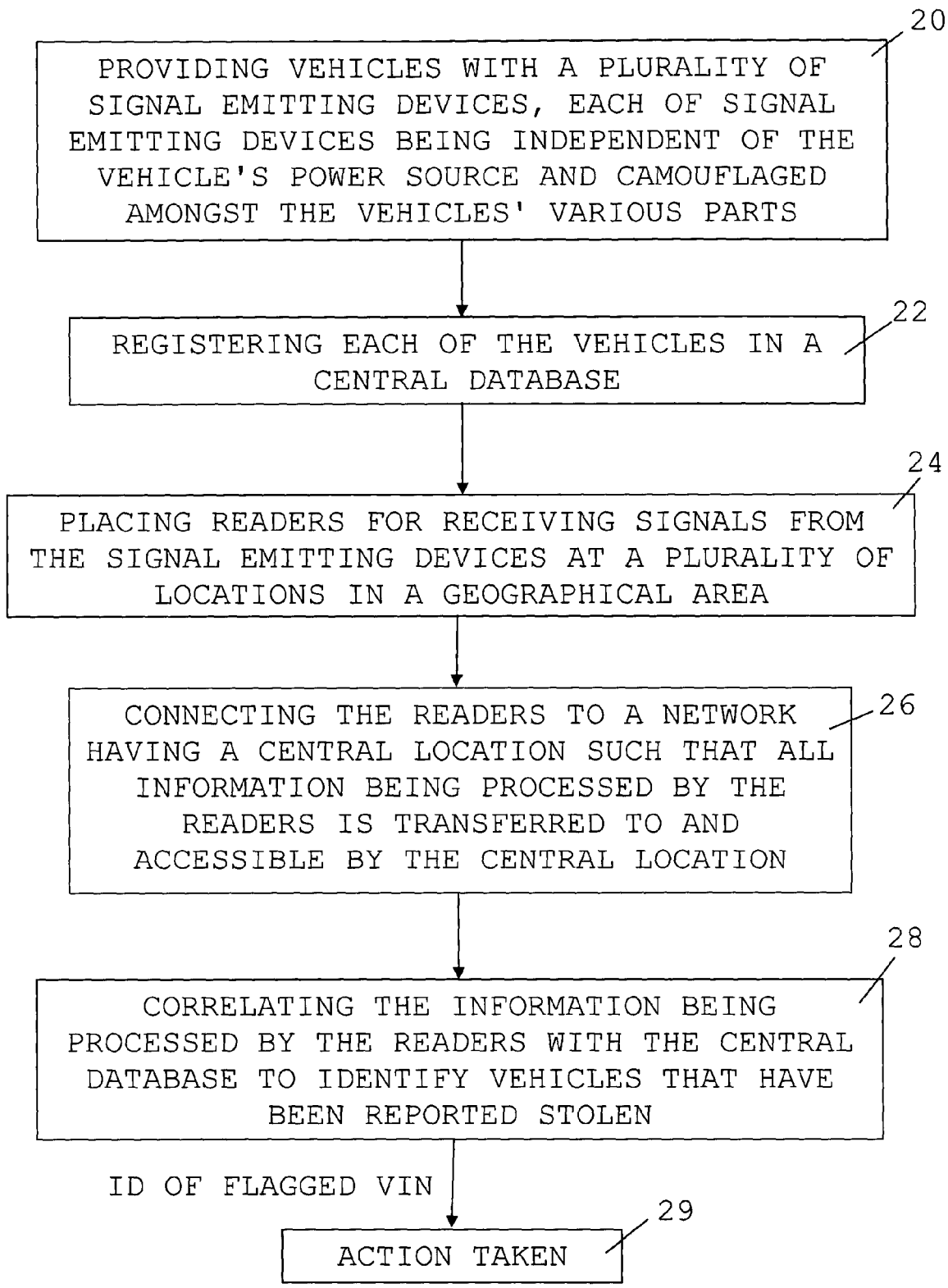
FIG. 1 is a flowchart of a method for locating stolen vehicles.

Throughout this application, the preferred embodiment of the present invention will be referred to as a "TAG" system. A TAG is to be understood as a signal emitting device that is placed within various parts of a vehicle. The signal is emitted for the purpose of transmitting information to a receiving entity. In one embodiment, the TAGs emit signals at regular or irregular intervals without being prompted to do so. In another embodiment, the TAGs will emit signals as a result of having received a prompt from either a TAG reader or the network with which the system works. It is also possible to have TAGs that emit signals without the prompt, but can also receive a request from a TAG reader or the network to emit at a particular point in time and emit in response to that request.

Unlike conventional anti-theft devices, the TAG system is virtually impossible to completely remove or bypass. The TAGs are stand-alone and do not need to be wired to the vehicle's power source. They can also operate at multiple frequencies, making it virtually impossible to detect the multiple TAGs installed in a vehicle. It is also impossible to jam the TAGs in a vehicle because they do not rely on a network to transmit. The TAG system can still operate as efficiently even if only one TAG remains in the vehicle. The TAG system has a substantial impact on deterring potential thefts due to its use of multiple TAGs that can be hidden in thousands of different locations throughout the vehicle. This includes locations that are virtually impossible to reach once the TAGs are dropped into an opening. The TAGs can also be affixed to the vehicle in such a way that an attempted removal of it causes damage to the vehicle. The TAG system can operate on a large geographical scale due to the fact that TAG readers can be located in virtually any area where vehicles circulate and can also be portable. The TAGs operate at very long ranges and can be read from long distances by the readers.

Scanning a vehicle should be understood to mean receiving and reading data being emitted by said signal emitting devices.

The outlined process for the TAG system is as follows. Major insurance companies mandate their customers to use the TAGs in their vehicles and also mandate the vendors that they do business with to use the TAG readers. Part vendors and body shops must use the TAG readers and be TAG certified as mandated by the major insurance companies in order to be authorized to sell to them. The demand for stolen vehicles and or stolen parts from the part vendors or body shops will then be dramatically reduced. Having witnessed the reduction in demand for stolen parts and or vehicles the thieves will in turn stay away from vehicles that are clearly identified as being equipped with the TAG system. The impossibility of completely removing or by-passing the TAGs in a vehicle, coupled with the dramatic drop in demand from illegal channels, will serve to deter thieves and substantially reduce vehicle theft overall.

The TAG system is comprised of a variable amount of transceivers and/or transponders and/or transmitters (TAGs), fixed and/or mobile electronic TAG readers and several identifying apparatuses such as warning labels or stickers.

The TAGs are installed or hidden within the vehicle to be protected. They are installed in such a manner that they are very difficult to find and virtually impossible to remove. In some cases, removal of the TAG would damage the part of the vehicle to which it is attached. The TAGs can be camouflaged by way of color matching their exterior to the vehicle's body color or by emulating a vehicle component usually found on the vehicle. The TAGS can be installed in the vehicle or affixed thereto in a variety of ways. They can be affixed using epoxy compounds, magnets, Velcro™, industrial tape, etc. The method used depends on the nature of the surface to which the TAG is affixed. Additionally, the TAG can be dropped into crevasses of the various parts of the vehicle, such as in between a door panel and the door to which the panel is attached.

The TAGs have the capability of transmitting information using multiple frequencies and signal strengths, as well as transmitting at varying times. They are also stand-alone in nature, i.e. they do not need to be hard-wired to the vehicle for power.

The TAG readers have various embodiments. They can be fixed or mobile in nature. Fixed TAG readers would generally be used in buildings or on exterior posts and so on. Mobile TAG readers would generally be used for surveying areas and or locations and could also be used by persons that are moving from location to location. The TAG readers could also have a display so that the user could read the information being read by the reader. For example, in the case of an automobile, the readers would be placed at locations such as ports, scrap yards, automotive parts resellers, body shops etc. The TAG readers would then display vehicle and or vehicle parts information being received from any TAGs found in and around that location. Alternatively, the readers do not display any information but simply transmit it directly to a central database.

The TAG system flow is as follows. Following the purchase of a TAG system the installation is done in the customer's vehicle followed by a customer registration in the database. Information such as year, make, color and model of the vehicle is part of the information contained in the registration.

Based on the proof of purchase the customer will benefit from a rebate and or credit from their insurance provider. The insurance company may provide additional incentive for installing the system, such as installation free of cost or the actual system free of cost.

TAG Readers are installed in strategic locations and or geographical areas such as salvage yards, body shops, garages, vehicle part vendors and so on. These various locations must be "TAG Certified" to become a "preferred" supplier or service provider to a member insurance company. In order for a location to be certified a verification of the reader installation must be done. This verification can be done by TAG personnel. The certified installation must be done in such a way as to make sure that all the vehicles and or parts that transit trough the location are automatically read with no exception.

TAG readers are updated with "flagged" vehicle identification numbers (VINs). In the event that a reader receives a flagged VIN from a TAG, it sends a notification to the central. Parts and/or vehicles are then seized or refused. The central then communicates with the location and/or law enforcement if applicable. The TAG readers can also send requests for information at any time.

In order to maintain transmission costs between the readers and the central to a minimum, the central database containing all the VINs will be updated with theft notifications. Once a day, or at any given time, the central database will update all of the readers via a wireless network, and/or various other means, with a list of VINs that are flagged as being stolen. The readers will then use this lookup table to correlate any VINs that they receive from TAGs. If a reader receives a VIN from a TAG that is indexed in its lookup table as being stolen, it will then send a notification to the central requesting that further action is taken.

In order for a location to sell to or be reimbursed for labor, parts or vehicles by any member insurance company it must be TAG Certified. Therein lies the incentive for a given location to be TAG Certified.

FIG. 1 is a flowchart illustrating a method of locating stolen vehicles. A first step is to provide vehicles with signal emitting devices 20. The signal emitting devices are independent of the vehicle's power source and are camouflaged among the vehicle's various parts so as not to be easy to locate. The next step is to register each vehicle having the signal emitting devices in a central database 22. Readers that receive signals from the signal emitting devices are placed in a plurality of locations within a geographical area 24. Each reader is connected to a network such that all information read and processed by the readers is transferred to and accessible by a central location 26. The information transferred to the central location is then correlated with the information in the central database to determine if a vehicle indexed as stolen was read by any of the readers 28.

In the event that a flagged VIN is identified by a reader, there are several actions that may be taken 29. TAG assistance may be requested and provided at the location of the reader having identified the flagged VIN. Alternatively, the parts or vehicle may be seized on the spot pending further investigation. Any transactions involving the parts or vehicle having a flagged VIN are immediately halted. Another alternative is that an enforcement agency, such as the police, is automatically notified of the positive identification of the flagged VIN and that agency proceeds according to its own procedures.

A reader may be passive or active. For example, active readers can have a display that indicates that a flagged VIN has been scanned. Passive readers can simply relay the information to the central and it is the police or the TAG system managers that will be informed that a reader at a specific location has identified a flagged VIN. Since the reader itself may or may not indicate that a positive identification has occurred, the immediate actions that can be taken at the location of the reader is a function of what type of reader is present.

Figure 2:
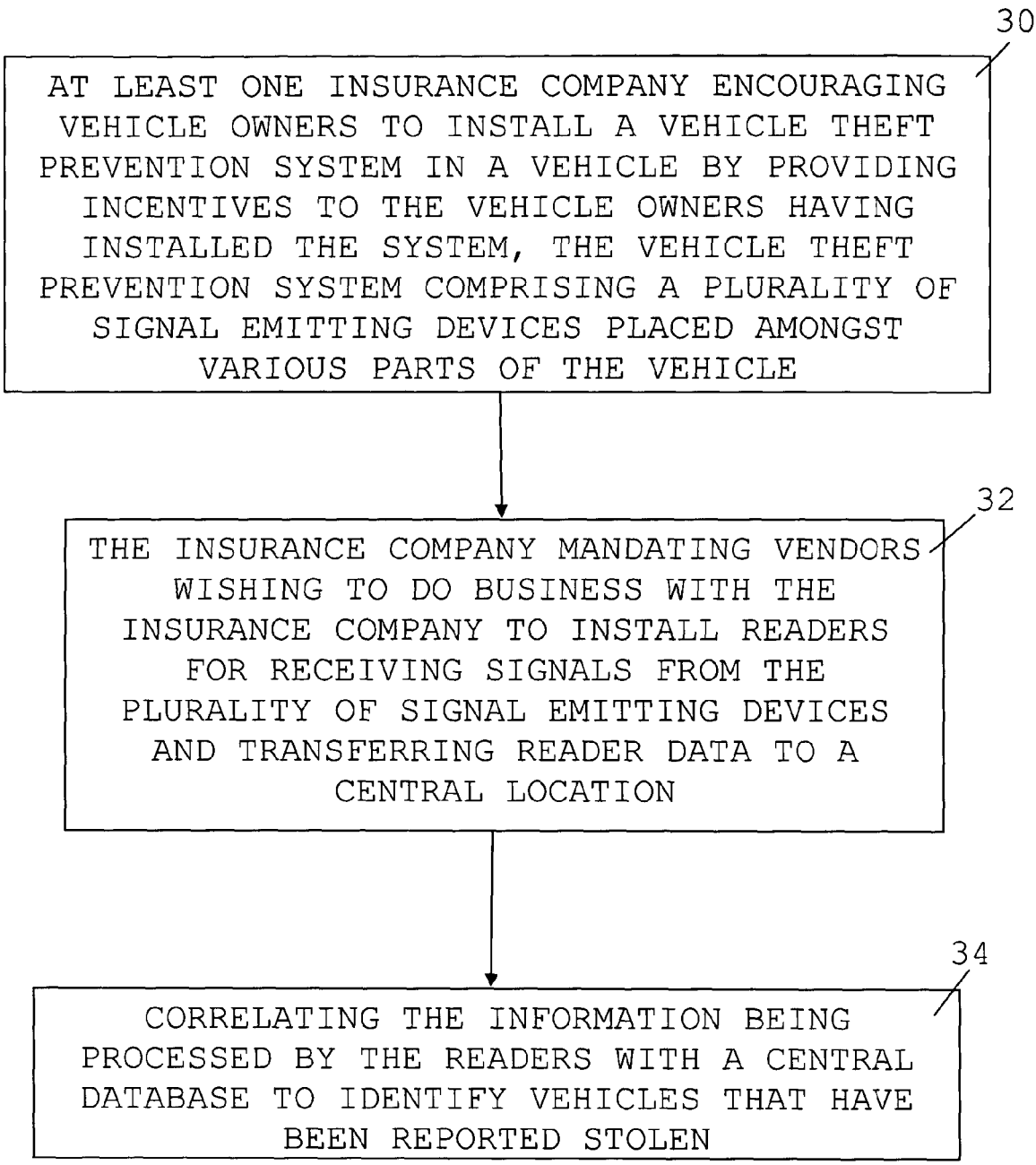
FIG. 2 is a flowchart of a method for preventing vehicle theft.

FIG. 2 is a flowchart illustrating a method of preventing vehicle thefts. At least one insurance company encourages vehicle owners to install a vehicle theft prevention system in a vehicle by providing incentives to the vehicle owners having installed the system 30. The incentives can vary, but can include such advantages as preferential rates on an insurance premium, free installation of the vehicle theft prevention system, or even providing the vehicle theft prevention system free of cost. In any case, the vehicle theft prevention system comprises a plurality of signal emitting devices placed among various parts of said vehicle. The insurance company mandates vendors wishing to do business with them to install readers for receiving signals from the plurality of signal emitting devices and for transferring reader data to a central location 32. The information being processed by the readers is then correlated with a central database to identify vehicles that have been reported stolen 34. In order to encourage vendors to install the readers, the insurance company can refuse to do business with any vendor who refuses to install the readers. The vendors can be garages, scrap yards, used car dealerships, etc.

Figure 3:
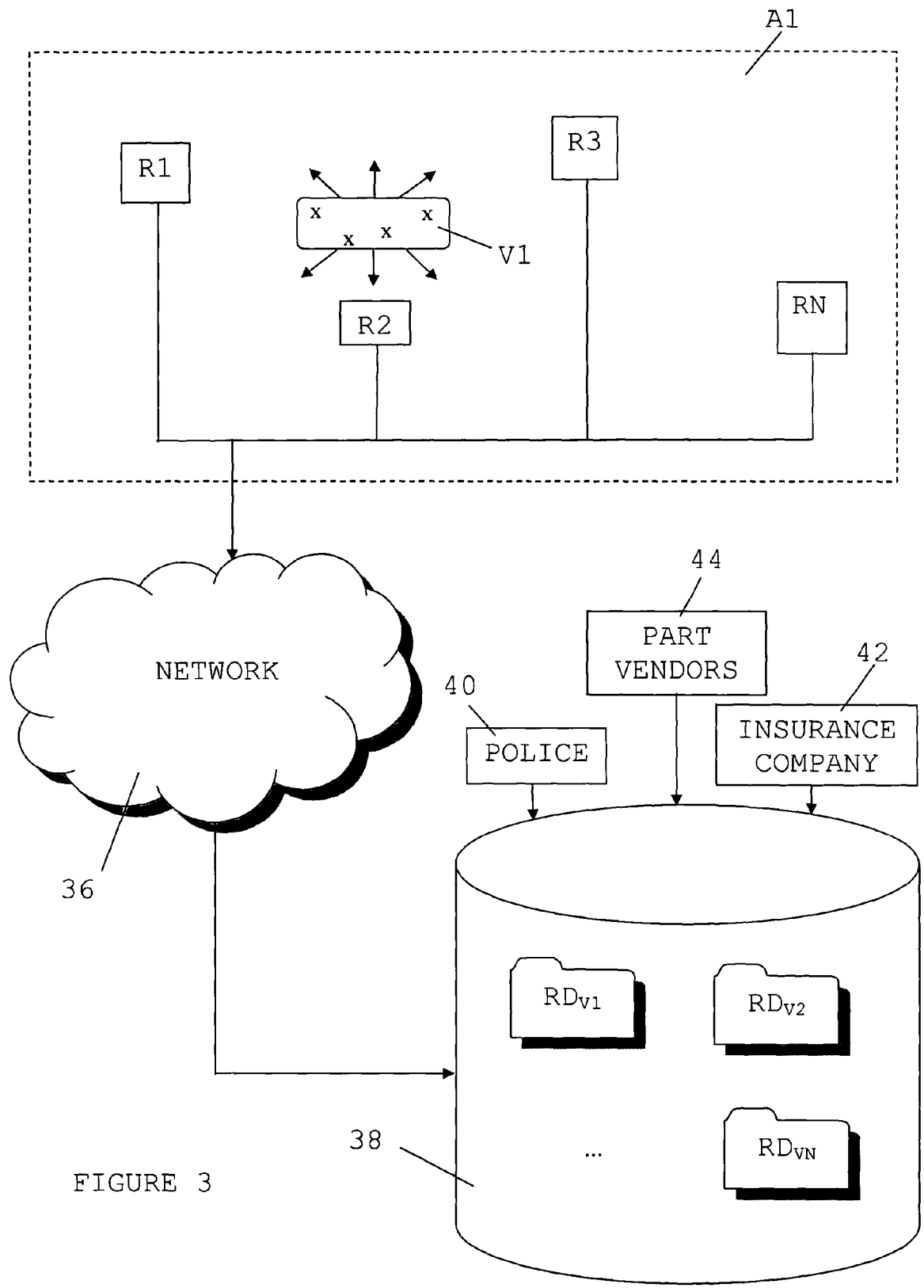
FIG. 3 is a block diagram illustrating a system for preventing vehicle theft.

FIG. 3 is a block diagram illustrating the system for preventing vehicle theft, according to a preferred embodiment. A plurality of readers R1, R2, R3, . . . RN, are provided in a large geographical area A1. A vehicle V1 is equipped with a plurality of signal emitting devices (X). Each of the readers are connected to a network 36, which is used to transfer reader data to a central location. The network 36 can be a network already in place, such as existing wireless network infrastructures or existing Telemetry networks. The central location comprises a central database 38 having registration data $RD_{V1}$, $RD_{V2}$, . . . $RD_{VN}$ corresponding to each vehicle equipped with the signal emitting devices. The central database 38 is correlated with the reader data to identify stolen vehicles. Additionally, various agencies such as the police 40, insurance companies 42, or part vendors 44 can access the database 24 hours a day in order to retrieve information or input data into the database, such as flags for stolen VINS. Essentially, any agency which would have a use for the database can be authorized access thereto. The access is to be controlled in order to avoid tampering with the information in the database.

The readers R1, R2, R3, . . . , RN may also communicate with each other, as well as communicate with the central database 38 through the network 36. Two-way communications of all of the entities in the system is also possible. In some instances, the central database 38 will receive information from the readers R1, R2, R3, . . . , RN through the network 36 while in other instances, it will send information to the readers R1, R2, R3, . . . , RN through the network 36. The TAGs themselves are also capable of two-way communication with the readers, i.e. they can send and receive data.

Updating of the database is necessary for vehicles that have body parts that are legally changed from one vehicle to another. The updating of the database can be done by anyone who is authorized for such a procedure.

While there are readers that are fixed and readers that are mobile, such as handheld readers for scanning purposes by law enforcement personnel, the fixed readers are capable of periodically verifying their own location to ensure that they have not been moved. This can be done by having the readers use a TAG placed in the near vicinity of the reader as a reference point. The strength of the signal received from the reference TAG will be an indication of the proximity of the reader to the reference point. The central system can periodically poll the various fixed readers in order to verify that their specific locations have not changed. Alternatively, the readers can independently verify their location and only send information to the central in the case of a discrepancy.

The difficulty of detecting the TAGs in a vehicle can be increased by having a number of functioning and a number of non-functioning devices in a single vehicle. Preferably, all major body parts of a vehicle are equipped with a TAG. Furthermore, while some TAGs are set to emit at a relatively high frequency, such as once every few minutes, others will only emit at a very low frequency, such as once every few hours. This will also discourage a car thief from sitting next to a vehicle and attempting to detect all possible TAGs within it.

In a preferred embodiment, there are at least two TAGs in each vehicle that is set to transmit only in response to a request from a reader. In order to avoid interference between the data being transmitted by a first TAG and the data being transmitted by a second TAG, the two TAGs are set to transmit at different times in response to the request. For example, the first TAG is set to transmit immediately upon reception of the request, whereas the second TAG is set to transmit after a delay of a fixed amount of milliseconds. The delay imposed on the second TAG should be sufficient to allow the reader to receive the data from the first TAG and then receive the data from the second TAG. It should be appreciated that if more than two TAGs are installed in a vehicle that respond to a request, multiple delays will be set to allow each TAG to transmit its data without interfering with data from another TAG.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for locating stolen vehicles and preventing vehicle theft, the method comprising:
   providing a vehicle with a plurality of signal emitting devices, each of said plurality of signal emitting devices being independent of said vehicle's power source and camouflaged among said vehicle's various parts;
   storing in a central database registration data for said vehicle;
   placing a plurality of readers for receiving signals from said plurality of signal emitting devices at a plurality of locations in a geographical area;
   connecting said readers through a network to said central database;
   at least one of said plurality of signal emitting devices initiating transmitting information from said vehicle to said readers;
   at least one of said plurality of readers receiving said information; and correlating said information being received by said readers with said registration data in said central database to identify vehicles that have been reported stolen;
   wherein each of said signal emitting device operates at a varying signal strength.

2. A method as claimed in claim 1, wherein at least one of said signal emitting devices will emit in response to a request from at least one of said readers and said network.

3. A method as claimed in claim 1, wherein each of said signal emitting devices operates at different frequencies.

4. A method as claimed in claim 1, wherein each of said signal emitting devices emits a signal at a different time.

5. A method as claimed in claim 1, wherein said plurality of signal emitting devices comprises a number of functional devices and a number of non-functional devices.

6. A method for locating stolen vehicles and preventing vehicle theft, the method comprising:
   providing a vehicle with a plurality of signal emitting devices, each of said plurality of signal emitting devices being independent of said vehicle's power source and camouflaged among said vehicle's various parts;
   storing in a central database registration data for said vehicle;
   placing a plurality of readers for receiving signals from said plurality of signal emitting devices at a plurality of locations in a geographical area;
   connecting said readers through a network to said central database:
   at least one of said plurality of signal emitting devices initiating transmitting information from said vehicle to said readers;
   at least one of said plurality of readers receiving said information; and
   correlating said information being received by said readers with said registration data in said central database to identify vehicles that have been reported stolen;
   wherein said camouflaging said devices among said various parts comprises color matching said device with a part in which said device is to be placed.

7. A method for locating stolen vehicles and preventing vehicle theft, the method comprising:
   providing a vehicle with a plurality of signal emitting devices, each of said plurality of signal emitting devices being independent of said vehicle's power source and camouflaged among said vehicle's various parts;
   storing in a central database registration data for said vehicle;
   placing a plurality of readers for receiving signals from said plurality of signal emitting devices at a plurality of locations in a geographical area;
   connecting said readers through a network to said central database;
   at least one of said plurality of signal emitting devices initiating transmitting information from said vehicle to said readers;
   at least one of said plurality of readers receiving said information; and correlating said information being received by said readers with said registration data in said central database to identify vehicles that have been reported stolen:
   wherein said camouflaging said devices among said various parts comprises emulating a vehicle component on a part in which said device is placed.

8. A method as claimed in claim 1, wherein said readers are fixed readers having a specific location.

9. A method as claimed in claim 8, wherein said fixed readers periodically verify said specific location to ensure said fixed readers have not been moved.

10. A method as claimed in claim 8, wherein said fixed readers are located in an enclosed area where vehicles regularly circulate.

11. A method as claimed in claim 10, wherein said fixed readers are TAG certified by TAG personnel to ensure that said fixed readers are positioned in a manner to scan all vehicles which enter said enclosed area.

12. A method as claimed in claim 1, further comprising at least one insurance company providing incentives to vehicle owners who use said signal emitting devices.

13. A method as claimed in claim 12, wherein at least one of said plurality of locations for said readers is a scrap yard, and vehicles entering said scrap yard are automatically read by said readers.

14. A method as claimed in claim 13, wherein said scrap yard having a reader is certified by said at least one insurance company.

15. A method as claimed in claim 1, wherein at least one of said signal emitting devices is provided in substantially all major body parts of said vehicle.

16. A method as claimed in claim 1, wherein at least some of said signal emitting devices emit signals at a frequency oil once every few hours.

17. A method as claimed in claim 1, wherein said signal emitting devices are embedded in said vehicle in a manner such that close inspection cannot detect a presence of said signal emitting devices.

18. A method as claimed in claim 1, wherein said signal emitting devices are embedded in said vehicle in a manner such that removal would damage said vehicle.

19. A system for preventing vehicle theft, the system comprising:
a plurality of signal emitting devices placed and camouflaged among various parts of a vehicle, each of said plurality of signal emitting devices being independent of said vehicle's power source and transmitting to a plurality of readers without being prompted to do so;
said plurality of readers placed at a plurality of locations in a geographical area and connected through a network to a central database, said plurality of readers receiving signals from said plurality of signal emitting device; and
a central database comprising registration data for each vehicle equipped with said signal emitting devices, and wherein said registration data in said central database is correlated with said reader data to identify vehicles that have been stolen;
wherein each of said signal emitting device operates at a varying signal strength.

20. A system as claimed in claim 19, wherein each of said signal emitting devices operates at a different frequency.

21. A system as claimed in claim 19, wherein each of said signal emitting devices emits a signal at a different time.

22. A system as claimed in claim 19, wherein said plurality of signal emitting devices comprises a number of functional devices and a number of non-functional devices.

23. A system as claimed in claim 19, wherein at least one of said plurality of locations for said readers is a scrap yard, and vehicles entering said scrap yard are automatically read by said readers.

24. A system as claimed in claim 19, wherein at least one of said locations is an enclosed area where vehicles regularly circulate.

25. A system as claimed in claim 19, wherein said readers in said enclosed area are TAG certified by TAG personnel to ensure that all vehicles which enter said enclosed area are scanned.

26. A system as claimed in claim 19, wherein said readers transmit requests to said signal emitting devices and said signal emitting devices receive said requests and emit signals in response to said requests.

27. A system as claimed in claim 19, wherein said database is accessible by various agencies for consultation.

28. A system as claimed in claim 19, wherein said database is accessible by various agencies for updating.

29. A system as claimed in claim 19, wherein said various parts of a vehicle are substantially all major body parts of said vehicle.

30. A system as claimed in claim 19, wherein said network is a wireless network.

31. A method for locating stolen vehicles and preventing vehicle theft, the method comprising:
providing each of said vehicles with a plurality of signal emitting devices, each of said plurality of signal emitting devices being independent of said vehicle's power source and camouflaged among said vehicles' various parts;
registering each of said vehicles in a central database;
placing readers for receiving signals from said plurality of signal emitting devices at a plurality of locations in a geographical area;
connecting said readers to a network having a central location such that all information being processed by said readers is transferred to and accessible by said central location; and
correlating said information being processed by said readers with said central database to identify vehicles that have been reported stolen
wherein said readers are fixed readers having a specific location and said fixed readers periodically verify said specific location to ensure said fixed readers have not been moved.

* * * * *